United States Patent
Fu et al.

(10) Patent No.: US 12,052,666 B2
(45) Date of Patent: Jul. 30, 2024

(54) SIGNAL PROCESSING METHOD AND APPARATUS, AND DEVICE WITH TIME-DOMAIN POSITION FOR MONITORING POWER-SAVING SIGNAL

(71) Applicant: DATANG MOBILE COMMUNICATIONS EQUIPMENT CO., LTD., Beijing (CN)

(72) Inventors: Jing Fu, Beijing (CN); Jing Liang, Beijing (CN); Meng Xu, Beijing (CN); Jinhua Miao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 438 days.

(21) Appl. No.: 17/427,878

(22) PCT Filed: Jan. 22, 2020

(86) PCT No.: PCT/CN2020/073771
§ 371 (c)(1),
(2) Date: Aug. 2, 2021

(87) PCT Pub. No.: WO2020/164389
PCT Pub. Date: Aug. 20, 2020

(65) Prior Publication Data
US 2022/0124625 A1    Apr. 21, 2022

(30) Foreign Application Priority Data
Feb. 15, 2019  (CN) .......................... 201910118162.8

(51) Int. Cl.
*H04W 52/02* (2009.01)
*H04W 16/28* (2009.01)
*H04W 68/00* (2009.01)

(52) U.S. Cl.
CPC ....... *H04W 52/0235* (2013.01); *H04W 16/28* (2013.01); *H04W 52/0229* (2013.01); *H04W 68/005* (2013.01)

(58) Field of Classification Search
CPC ............. H04W 52/0235; H04W 16/28; H04W 52/0229; H04W 68/005; H04W 68/02;
(Continued)

(56) References Cited

U.S. PATENT DOCUMENTS

2009/0209273 A1   8/2009   Ha et al.
2014/0198882 A1   7/2014   Batchu et al.
(Continued)

FOREIGN PATENT DOCUMENTS

CN    101911544 A    12/2010
CN    104754627 A    7/2015
(Continued)

OTHER PUBLICATIONS

Supplementary European Search Report for European Patent Application 20756132.5 issued on Mar. 2, 2022.
(Continued)

*Primary Examiner* — Kiet Tang
(74) *Attorney, Agent, or Firm* — Ladas & Parry, LLP

(57) ABSTRACT

The present disclosure relates to the field of communications technology, and provides a signal processing method, a signal processing apparatus and a device. The signal processing method includes: determining a time-domain position for monitoring a power-saving signal; and monitoring the power-saving signal in accordance with the time-domain position.

18 Claims, 3 Drawing Sheets

(58) Field of Classification Search
CPC ..... H04W 72/23; H04W 48/16; H04W 76/28; H04W 72/0446; H04W 72/044; Y02D 30/70
See application file for complete search history.

(56) References Cited

U.S. PATENT DOCUMENTS

| | | | |
|---|---|---|---|
| 2020/0221462 A1* | 7/2020 | Tang | H04W 72/0446 |
| 2021/0014786 A1* | 1/2021 | Shi | H04W 72/044 |
| 2021/0136687 A1 | 5/2021 | Kaisha | |
| 2021/0144646 A1* | 5/2021 | Xu | H04W 76/28 |

FOREIGN PATENT DOCUMENTS

| | | |
|---|---|---|
| CN | 109309555 A | 2/2019 |
| CN | 109327889 A | 2/2019 |
| EP | 3661094 A1 | 6/2020 |
| WO | 2018174635 A1 | 9/2018 |
| WO | 2019019960 A1 | 1/2019 |
| WO | 2019027242 A1 | 2/2019 |
| WO | 2019029711 A1 | 2/2019 |

OTHER PUBLICATIONS

"Further Considerations on triggering for UE power saving", 3GPP TSG RAN WG1 Meeting AH-1901 R1-1900227, Taipei, Jan. 21-25, 2019, Source: ZTE, Agenda Item: 7.2.9.2.2.

"Consideration on resource of power saving signal for paging monitoring", 3GPP TSG RAN WG1 ad-Hoc Meeting 1901, R1-1900423, Taipei, Jan. 21-25, 2019, Source: CMCC, Agenda Item: 7.2.9.4.

Huawei, HiSilicon, "Updated feature lead summary of Wake-up signal configurations and procedures in NB-IoT", R1-1807560, 3GPP TSG RAN WG1 Meeting #93, Busan, Korea, May 21-25, 2018, all pages.

International Search Report from PCT/CN2020/073771, dated Apr. 10, 2020, with English translation WIPO, all pages.

Written Opinion of the International Searching Authority from PCT/CN2020/073771, dated Apr. 10, 2020, with English translation from WIPO, all pages.

International Preliminary Report on Patentability from PCT/CN2020/073771, dated Aug. 10, 2021, with English translation from WIPO, all pages.

* cited by examiner

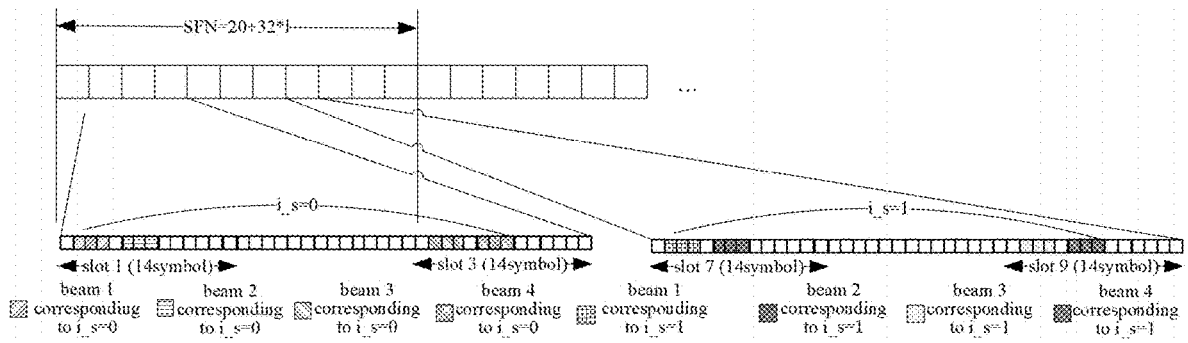
Fig.7
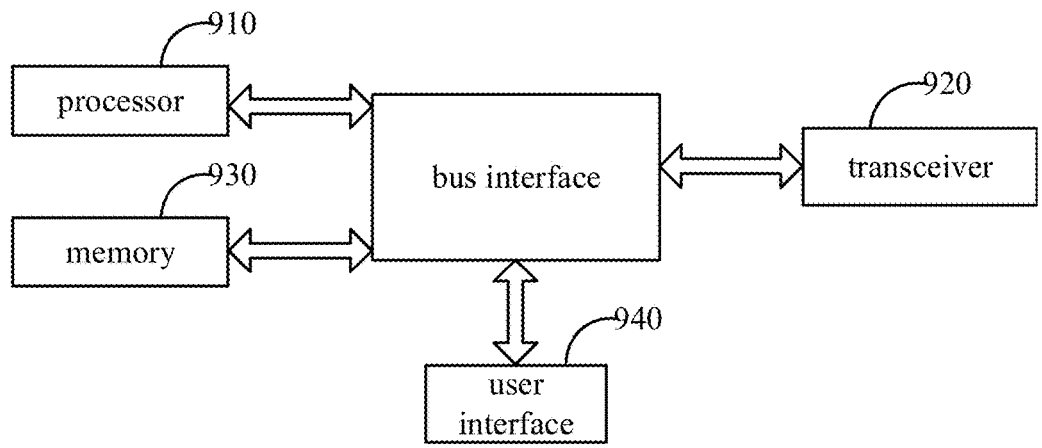
Fig.8
Fig.9
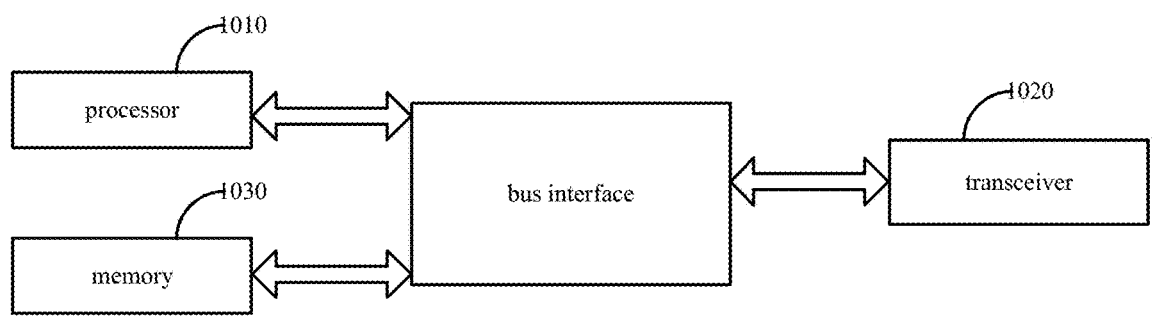
Fig.10

SIGNAL PROCESSING METHOD AND APPARATUS, AND DEVICE WITH TIME-DOMAIN POSITION FOR MONITORING POWER-SAVING SIGNAL

CROSS REFERENCE TO RELATED APPLICATIONS

This application is the U.S. national phase of PCT Application No. PCT/CN2020/073771 filed on Jan. 22, 2020, which claims a priority of the Chinese patent application No. 201910118162.8 filed in China on Feb. 15, 2019, the disclosures of which are incorporated herein by reference in their entireties.

TECHNICAL FIELD

The present disclosure relates to the field of communications technology, in particular to a signal processing method, a signal processing apparatus, and a device.

BACKGROUND

A New Radio (NR) system supports a multi-beam operation. In order to achieve a full coverage for paging, the NR system supports paging for beam sweeping, and each beam carries a same paging message.

For the sake of power-saving, a User Equipment (UE) needs to monitor a power-saving signal before monitoring the paging. When the UE determines, through monitoring the power-saving signal, that there is the paging message to be transmitted, it continues to monitor the paging message or a Physical Downlink Control Channel (PDCCH) signal corresponding to the paging message. Otherwise, the UE does not monitor the corresponding paging message or the PDCCH signal corresponding to the paging signal, and instead, it continues to monitor the power-saving signal on a next occasion. The power-saving signal has a lower parsing complexity level or a smaller quantity of parsing times than the PDCCH signal, so it is able to achieve a power-saving effect.

However, in the NR system in the related art, when a beam sweeping mode is adopted, it is impossible to determine a time-domain position of the power-saving signal, so it is impossible to achieve the power-saving effect.

SUMMARY

An object of the present disclosure is to provide a signal processing method, a signal processing apparatus, and a device, so as to solve the problem that it is impossible to determine the time-domain position of the power-saving signal and thereby it is impossible to achieve the power-saving effect.

In one aspect, the present disclosure provides in some embodiments a signal processing method, including:
  determining a time-domain position for monitoring a power-saving signal; and
  monitoring the power-saving signal in accordance with the time-domain position.

In a possible embodiment of the present disclosure, the determining the time-domain position for monitoring the power-saving signal includes:
  obtaining each radio frame corresponding to the power-saving signal;
  obtaining an index number corresponding to a power-saving signal monitoring occasion, wherein the index number is a logic serial number corresponding to a power-saving signal monitoring occasion among all power-saving signal occasions within one paging periodicity or one power-saving signal periodicity, and a start point of each of the all power-saving signal occasions is the respective radio frame; and
  obtaining the time-domain position of the power-saving signal corresponding to the index number.

In a possible embodiment of the present disclosure, the obtaining the radio frame corresponding to the power-saving signal includes:
  when the power-saving signal periodicity is equal to the paging periodicity, obtaining a System Frame Number (SFN) corresponding to the power-saving signal through a formula (SFN+powersavingframeoffset) mod T=(T div N)*(UE_ID mod N); and
  when the power-saving signal periodicity is equal to number k of paging periodicities, obtaining the SFN corresponding to the power-saving signal through a formula (SFN+powersavingframeoffset) mod (k*T)=(T div N)*(UE_ID mod N), where k is an integer greater than 1,
  wherein powersavingframeoffset represents a frame offset of the power-saving signal, T represents the paging periodicity, N represents the quantity of paging radio frames within one paging periodicity, and UE_ID=Serving-Temporary Mobile Subscriber Identity (S-TMSI) mod 1024.

In a possible embodiment of the present disclosure, the obtaining the radio frame corresponding to the power-saving signal includes:
  taking an SFN corresponding to a paging monitoring occasion as the SFN corresponding to the power-saving signal.

In a possible embodiment of the present disclosure, the obtaining the index number corresponding to the power-saving signal monitoring occasion includes:
  obtaining an index number i_s through a formula i_s=floor (UE_ID/N) mod Ns, where Ns represents the quantity of paging occasions associated with one paging radio frame, and UE_ID=S-TMSI mod 1024.

In a possible embodiment of the present disclosure, the time-domain position includes a start time point;
  the obtaining the time-domain position of the power-saving signal corresponding to the index number includes:
  determining a start time point of the power-saving signal occasion corresponding to a current index number.

In a possible embodiment of the present disclosure, the determining the start time point of the power-saving signal occasion corresponding to the current index number includes:
  taking a time-domain start position of an $[(i\_s*x)+1]^{th}$ power-saving signal as the start time point of the power-saving signal occasion corresponding to the current index number; or
  looking up the start time point of the power-saving signal monitoring occasion corresponding to the current index number in accordance with a start position of each configured power-saving signal occasion,
  where i_s represents the index number corresponding to the power-saving signal occasion, and x represents the quantity of power-saving signals within a beam sweeping periodicity corresponding to one power-saving signal monitoring occasion.

In a possible embodiment of the present disclosure, the taking the time-domain start position of the $[(i\_s*x)+1]^{th}$ power-saving signal as the start time point of the power-saving signal occasion corresponding to the current index number includes:

taking a position t+M as the time-domain start position of the $[(i\_s*x)+1]^{th}$ power-saving signal, where $M=i\_s*x$, and t represents a start time point of the first power-saving signal in the power-saving signal occasion corresponding to the current index number; or determining a position of each power-saving signal in each power-saving signal occasion in accordance with a duration of the power-saving signal, and a periodicity of the power-saving signal and/or a periodicity offset of the power-saving signal, and ranking the positions of the power-saving signals to obtain the time-domain start position of the $[(i\_s*x)+1]^{th}$ power-saving signal.

In a possible embodiment of the present disclosure, the time-domain position further includes a position of the power-saving signal occasion, wherein the obtaining the time-domain position of the power-saving signal corresponding to the index number includes:

taking, in accordance with the start time point of the time-domain position, consecutive number y*x of time lengths as the position of the power-saving signal occasion corresponding to the index number, wherein a start point of the consecutive number y*x of time lengths is the start time point of the time-domain position; or taking, in accordance with the start time point of the time-domain position, and a periodicity of the power-saving signal and/or a periodicity offset of the power-saving signal, a time-domain length of number x of power-saving signals as the position of the power-saving signal occasion corresponding to the index number, wherein a start point of the number x of power-saving signals is the start time point of the time-domain position, where y represents a duration of the power-saving signal, and x represents the quantity of power-saving signals within a beam sweeping periodicity corresponding to one power-saving signal monitoring occasion.

In a possible embodiment of the present disclosure, the time-domain position further includes a symbol carrying the power-saving signal;

the obtaining the time-domain position of the power-saving signal corresponding to the index number includes:

determining the symbol carrying the power-saving signal in the position of the power-saving signal occasion corresponding to the index number in accordance with a symbol position of the power-saving signal.

In a possible embodiment of the present disclosure, prior to monitoring the power-saving signal in accordance with the time-domain position, the signal processing method further includes:

determining a target beam direction for monitoring the power-saving signal in accordance with a beam direction of a received system synchronization block, and a relationship between a beam direction of the power-saving signal and the beam direction of the system synchronization block.

In a possible embodiment of the present disclosure, the monitoring the power-saving signal in accordance with the time-domain position includes:

monitoring the power-saving signal corresponding to the target beam direction in the power-saving signal occasion in accordance with the position of the power-saving signal occasion in the time-domain position.

In a possible embodiment of the present disclosure, prior to determining the time-domain position for monitoring the power-saving signal, the signal processing method further includes:

receiving time-domain configuration information of a network device, wherein the time-domain configuration information is used to configure the time-domain position of the power-saving signal.

In a possible embodiment of the present disclosure, the time-domain configuration information includes at least one of:

a frame offset for determining a frame position where the power-saving signal occurs;

an occurring occasion for determining a start position of each power-saving signal occasion;

the quantity of power-saving signals within one beam sweeping periodicity;

a periodicity for determining a position where the power-saving signal occurs;

a periodicity offset for determining the position where the power-saving signal occurs;

a symbol position for indicating a symbol corresponding to the power-saving signal occurring within one slot or indicating that a start position of the power-saving signal corresponds to a symbol within one slot;

a duration for indicating the quantity of consecutive slots or consecutive symbols occupied by the power-saving signal;

a relationship between a beam direction of the power-saving signal and a beam direction of a system synchronization block;

a relationship that is between a periodicity of the power-saving signal and a paging periodicity and used to indicate that one power-saving signal is equal to number k of paging periodicities.

In another aspect, the present disclosure provides in some embodiments a signal processing method, including:

transmitting time-domain configuration information, wherein the time-domain configuration information is used to configure a time-domain position of the power-saving signal.

In a possible embodiment of the present disclosure, the time-domain configuration information includes at least one of:

a frame offset for determining a frame position where the power-saving signal occurs;

an occurring occasion for determining a start position of each occasion where the power-saving signal occurs;

the quantity of power-saving signals within one beam sweeping periodicity;

a periodicity for determining a position where the power-saving signal occurs;

a periodicity offset for determining the position where the power-saving signal occurs;

a symbol position for indicating a symbol corresponding to the power-saving signal occurring within one slot or indicating that a start position of the power-saving signal corresponds to a symbol within one slot;

a duration for indicating the quantity of consecutive slots or consecutive symbols occupied by the power-saving signal;

a relationship between a beam direction of the power-saving signal and a beam direction of a system synchronization block;

a relationship that is between a periodicity of the power-saving signal and a paging periodicity and used to indicate that one power-saving signal is equal to number k of paging periodicities.

In a possible embodiment of the present disclosure, the signal processing method further includes:

transmitting the power-saving signal in accordance with the time-domain configuration information.

In yet another aspect, the present disclosure provides in some embodiments a User Equipment (UE), including a transceiver, a memory, a processor, and a computer program stored in the memory and capable of being executed by the processor, wherein the processor is configured to execute the computer program to:

determine a time-domain position for monitoring a power-saving signal;

monitor the power-saving signal in accordance with the time-domain position.

In a possible embodiment of eh present disclosure, the processor is further configured to execute the program to:

obtain each radio frame corresponding to the power-saving signal;

obtain an index number corresponding to a power-saving signal monitoring occasion, wherein the index number is a logic serial number corresponding to a power-saving signal monitoring occasion among all power-saving signal occasions within one paging periodicity or one power-saving signal periodicity, and a start point of each of the all power-saving signal occasions is the respective radio frame; and obtain the time-domain position of the power-saving signal corresponding to the index number.

In a possible embodiment of the present disclosure, the processor is further configured to execute the program to:

when the power-saving signal periodicity is equal to the paging periodicity, obtain an SFN corresponding to the power-saving signal through a formula (SFN+powersavingframeoffset) mod T=(T div N)*(UE_ID mod N); and when the power-saving signal periodicity is equal to number k of paging periodicities, obtain the SFN corresponding to the power-saving signal through a formula (SFN+powersavingframeoffset) mod (k*T) =(T div N)*(UE_ID mod N), where k is an integer greater than 1, wherein powersavingframeoffset represents a frame offset of the power-saving signal, T represents the paging periodicity, N represents the quantity of paging radio frames within one paging periodicity, and UE_ID=S-TMSI mod 1024.

In a possible embodiment of the present disclosure, the processor is further configured to execute the program to:

take an SFN corresponding to a paging monitoring occasion as the SFN corresponding to the power-saving signal.

In a possible embodiment of the present disclosure, the processor is further configured to execute the program to:

obtain an index number i_s through a formula i_s=floor (UE_ID/N) mod Ns, where Ns represents the quantity of paging occasions associated with one paging radio frame, and UE_ID=S-TMSI mod 1024.

In a possible embodiment of the present disclosure, the time-domain position includes a start time point;

the processor is further configured to execute the program to:

determine a start time point of the power-saving signal occasion corresponding to a current index number.

In a possible embodiment of the present disclosure, the processor is further configured to execute the program to:

take a time-domain start position of an $[(i\_s*x)+1]^{th}$ power-saving signal as the start time point of the power-saving signal occasion corresponding to the current index number; or look up the start time point of the power-saving signal monitoring occasion corresponding to the current index number in accordance with a start position of each configured power-saving signal occasion, where i_s represents the index number corresponding to the power-saving signal occasion, and x represents the quantity of power-saving signals within a beam sweeping periodicity corresponding to one power-saving signal monitoring occasion.

In a possible embodiment of the present disclosure, the processor is further configured to execute the program to:

take a position t+M as the time-domain start position of the $[(i\_s*x)+1]^{th}$ power-saving signal, where M=i_s*x, and t represents a start time point of the first power-saving signal in the power-saving signal occasion corresponding to the current index number; or determine a position of each power-saving signal in each power-saving signal occasion in accordance with a duration of the power-saving signal, and a periodicity of the power-saving signal and/or a periodicity offset of the power-saving signal, and rank the positions of the power-saving signals to obtain the time-domain start position of the $[(i\_s*x)+1]^{th}$ power-saving signal.

In a possible embodiment of the present disclosure, the time-domain position further includes a position of the power-saving signal occasion, wherein the processor is further configured to execute the program to:

take, in accordance with the start time point of the time-domain position, consecutive number y*x of time lengths as the position of the power-saving signal occasion corresponding to the index number, wherein a start point of the consecutive number y*x of time lengths is the start time point of the time-domain position; or take, in accordance with the start time point of the time-domain position, and a periodicity of the power-saving signal and/or a periodicity offset of the power-saving signal, a time-domain length of number x of power-saving signals as the position of the power-saving signal occasion corresponding to the index number, wherein a start point of the number x of power-saving signals is the start time point of the time-domain position, where y represents a duration of the power-saving signal, and x represents the quantity of power-saving signals within a beam sweeping periodicity corresponding to one power-saving signal monitoring occasion.

In a possible embodiment of the present disclosure, the time-domain position further includes a symbol carrying the power-saving signal;

the processor is further configured to execute the program to:

determine the symbol carrying the power-saving signal in the position of the power-saving signal occasion corresponding to the index number in accordance with a symbol position of the power-saving signal.

In a possible embodiment of the present disclosure, the processor is further configured to execute the program to:

determine a target beam direction for monitoring the power-saving signal in accordance with a beam direction of a received system synchronization block, and a relationship between a beam direction of the power-saving signal and the beam direction of the system synchronization block.

In a possible embodiment of the present disclosure, the processor is further configured to execute the program to:
monitor the power-saving signal corresponding to the target beam direction in the power-saving signal occasion in accordance with the position of the power-saving signal occasion in the time-domain position.

In a possible embodiment of the present disclosure, the processor is further configured to execute the program to:
receive time-domain configuration information of a network device, wherein the time-domain configuration information is used to configure the time-domain position of the power-saving signal.

In a possible embodiment of the present disclosure, the time-domain configuration information includes at least one of:
a frame offset for determining a frame position where the power-saving signal occurs;
an occurring occasion for determining a start position of each power-saving signal occasion;
the quantity of power-saving signals within one beam sweeping periodicity;
a periodicity for determining a position where the power-saving signal occurs;
a periodicity offset for determining the position where the power-saving signal occurs;
a symbol position for indicating a symbol corresponding to the power-saving signal occurring within one slot or indicating that a start position of the power-saving signal corresponds to a symbol within one slot;
a duration for indicating the quantity of consecutive slots or consecutive symbols occupied by the power-saving signal;
a relationship between a beam direction of the power-saving signal and a beam direction of a system synchronization block;
a relationship that is between a periodicity of the power-saving signal and a paging periodicity and used to indicate that one power-saving signal is equal to number k of paging periodicities.

In still yet another aspect, the present disclosure provides in some embodiments a network device, including a transceiver, a memory, a processor, and a computer program stored in the memory and capable of being executed by the processor, wherein the processor is configured to execute the program to:
transmit time-domain configuration information, wherein the time-domain configuration information is used to configure a time-domain position of the power-saving signal.

In a possible embodiment of the present disclosure, the time-domain configuration information includes at least one of:
a frame offset for determining a frame position where the power-saving signal occurs;
an occurring occasion for determining a start position of each power-saving signal occasion;
the quantity of power-saving signals within one beam sweeping periodicity;
a periodicity for determining a position where the power-saving signal occurs;
a periodicity offset for determining the position where the power-saving signal occurs;
a symbol position for indicating a symbol corresponding to the power-saving signal occurring within one slot or indicating that a start position of the power-saving signal corresponds to a symbol within one slot;
a duration for indicating the quantity of consecutive slots or consecutive symbols occupied by the power-saving signal;
a relationship between a beam direction of the power-saving signal and a beam direction of a system synchronization block;
a relationship that is between a periodicity of the power-saving signal and a paging periodicity and used to indicate that one power-saving signal is equal to number k of paging periodicities.

In a possible embodiment of the present disclosure, the processor is further configured to execute the program to:
transmit the power-saving signal in accordance with the time-domain configuration information.

In still yet another aspect, the present disclosure provides in some embodiments a signal processing apparatus, including:
a processing module configured to determine a time-domain position for monitoring a power-saving signal;
a monitoring module configured to monitor the power-saving signal in accordance with the time-domain position.

In a possible embodiment of the present disclosure, the processing module includes:
a first obtaining sub-module configured to obtain each radio frame corresponding to the power-saving signal;
a second obtaining sub-module configured to obtain an index number corresponding to a power-saving signal monitoring occasion, wherein the index number is a logic serial number corresponding to a power-saving signal monitoring occasion among all power-saving signal occasions within one paging periodicity or one power-saving signal periodicity, and a start point of each of the all power-saving signal occasions is the respective radio frame; and
a third obtaining sub-module configured to obtain the time-domain position of the power-saving signal corresponding to the index number.

In still yet another aspect, the present disclosure provides in some embodiments a signal processing apparatus, including:
a transmission module configured to transmit time-domain configuration information, wherein the time-domain configuration information is used to configure a time-domain position of the power-saving signal.

In a possible embodiment of the present disclosure, the time-domain configuration information includes at least one of:
a frame offset for determining a frame position where the power-saving signal occurs;
an occurring occasion for determining a start position of each occasion where the power-saving signal occurs;
the quantity of power-saving signals within one beam sweeping periodicity;
a periodicity for determining a position where the power-saving signal occurs;
a periodicity offset for determining the position where the power-saving signal occurs;
a symbol position for indicating a symbol corresponding to the power-saving signal occurring within one slot or indicating that a start position of the power-saving signal corresponds to a symbol within one slot;

a duration for indicating the quantity of consecutive slots or consecutive symbols occupied by the power-saving signal;

a relationship between a beam direction of the power-saving signal and a beam direction of a system synchronization block;

a relationship that is between a periodicity of the power-saving signal and a paging periodicity and used to indicate that one power-saving signal is equal to number k of paging periodicities.

In still yet another aspect, the present disclosure provides in some embodiments a computer-readable storage medium storing therein a program. The program is executed by a processor so as to implement steps of the above-mentioned signal processing method for the UE.

In still yet another aspect, the present disclosure provides in some embodiments a computer-readable storage medium storing therein a program. The program is executed by a processor so as to implement steps of the above-mentioned signal processing method for the network device.

The present disclosure has the following beneficial effect: according to the signal processing method in the embodiments of the present disclosure, the time-domain position of the power-saving signal is determined at first, so it is able to effectively monitor the power-saving signal at the time-domain position, thereby to achieve a power-saving effect.

BRIEF DESCRIPTION OF THE DRAWINGS

FIG. 7 is a fifth schematic view showing the application of the signal processing method according to an embodiment of the present disclosure;

FIG. 8 is a flow chart of a signal processing method according to another embodiment of the present disclosure;

FIG. 9 is a schematic view showing a structure of a UE according to an embodiment of the present disclosure; and FIG. 10 is a schematic view showing a structure of a network device according to an embodiment of the present disclosure.

DETAILED DESCRIPTION

In order to make the objects, the technical solutions and the advantages of the present disclosure more apparent, the present disclosure will be described hereinafter in details in conjunction with the drawings and embodiments.

Figure 1:
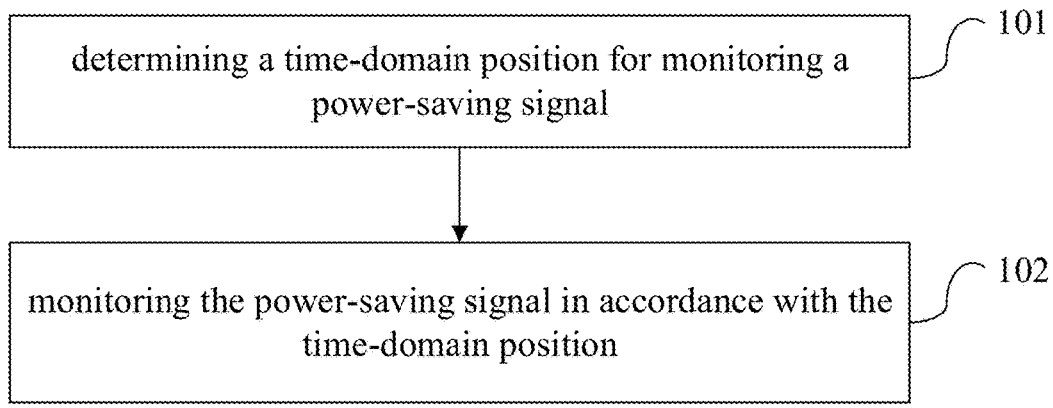
FIG. 1 is a first flow chart of a signal processing method according to an embodiment of the present disclosure.

As shown in FIG. 1, the present disclosure provides in some embodiments a signal processing method, which includes:

Step 101 of determining a time-domain position for monitoring a power-saving signal;

Step 102 of monitoring the power-saving signal in accordance with the time-domain position.

Here, through Steps 101 and 102, a UE to which the signal processing method in the embodiments of the present disclosure is applied determines the time-domain position for monitoring the power-saving signal at first, so it is able to effectively monitor the power-saving signal at the time-domain position, thereby to achieve a power-saving effect.

The power-saving signal is a Channel State Information Reference Signal (CSI-RS) of the channel, a wake-up signal, a synchronization signal, or a special Physical Downlink Control Channel (PDCCH), which will not be particularly defined herein.

Figure 2:
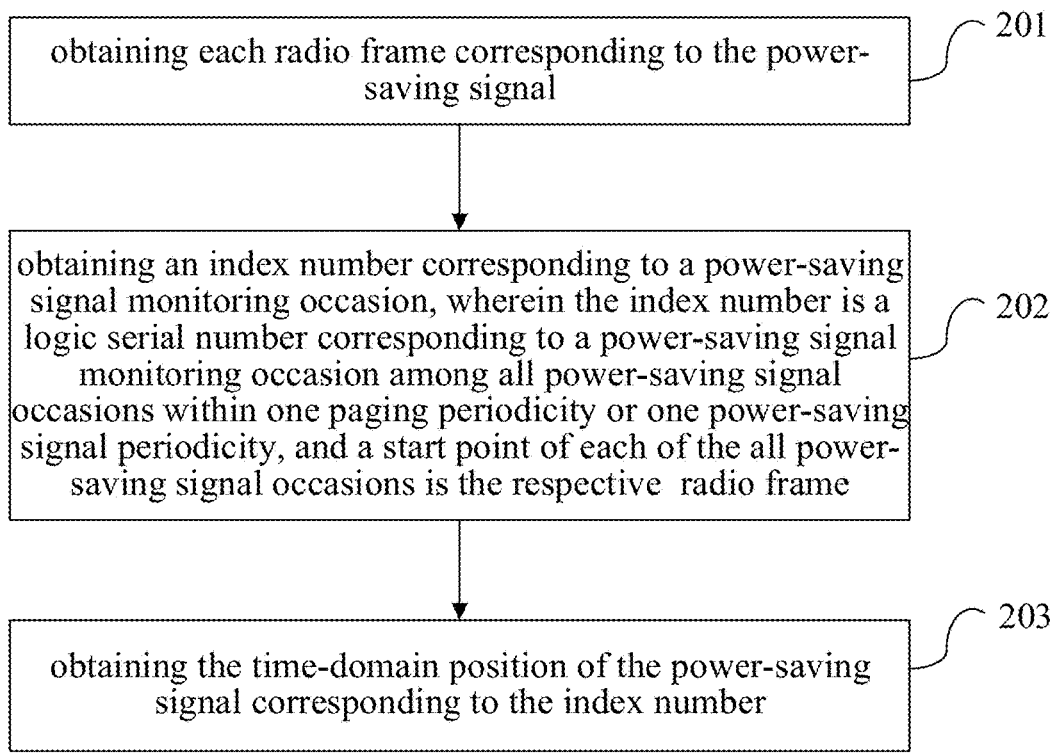
FIG. 2 is a second flow chart of the signal processing method according to an embodiment of the present disclosure.

In a possible embodiment of the present disclosure, as shown in FIG. 2, Step 101 includes:

Step 201 of obtaining each radio frame corresponding to the power-saving signal;

Step 202 of obtaining an index number corresponding to a power-saving signal monitoring occasion, wherein the index number is a logic serial number corresponding to a power-saving signal monitoring occasion among all power-saving signal occasions within one paging periodicity or one power-saving signal periodicity, and a start point of each of the all power-saving signal occasions is the respective radio frame; and Step 203 of obtaining the time-domain position of the power-saving signal corresponding to the index number.

Through Steps 201 to 203, the UE obtains the radio frame corresponding to the power-saving signal, then obtains the index number corresponding to the power-saving signal monitoring occasion, and finally obtains the time-domain position of the power-saving signal corresponding to the index number, so as to facilitate the subsequent monitoring of the power-saving signal.

In a possible embodiment of the present disclosure, Step 201 includes:

when the power-saving signal periodicity is equal to the paging periodicity, obtaining a System Frame Number (SFN) corresponding to the power-saving signal through a formula (SFN+powersavingframeoffset) mod T=(T div N)*(UE_ID mod N); and when the power-saving signal periodicity is equal to number k of paging periodicities, obtaining the SFN corresponding to the power-saving signal through a formula (SFN+powersavingframeoffset) mod (k*T) =(T div N)*(UE_ID mod N), where k is an integer greater than 1, wherein powersavingframeoffset represents a frame offset of the power-saving signal, T represents the paging periodicity, N represents the quantity of paging radio frames within one paging periodicity, and UE_ID=Serving-Temporary Mobile Subscriber Identity (S-TMSI) mod 1024.

Here, powersavingframeoffset, T, N and S-TMSI are configured by a network or predefined (defined through a protocol). The SFN corresponding to the power-saving signal is obtained through a corresponding formula in conjunction with a relationship between the power-saving signal periodicity and the paging periodicity. The relationship between the power-saving signal periodicity and the paging periodicity includes the parameter k, and k is an integer greater than 1.

In addition, in the embodiments of the present disclosure, Step 201 includes:

taking an SFN corresponding to a paging monitoring occasion as the SFN corresponding to the power-saving signal.

Here, the SFN of a paging signal continues to be used by the radio frame corresponding to the power-saving signal.

In a possible embodiment of the present disclosure, subsequent to obtaining the radio frame corresponding to the power-saving signal, Step 202 includes:

obtaining an index number i_s through a formula i_s=floor (UE_ID/N) mod Ns, where Ns represents the quantity of paging occasions associated with one paging radio frame, and UE_ID=S-TMSI mod 1024.

Here, i_s is obtained through the formula i_s=floor (UE_ID/N) mod Ns, and i_s=0, 1, . . . , so as to enable the UE to monitor an $(i\_s+1)^{th}$ power-saving signal occasion with the SFN as a start point.

In a possible embodiment of the present disclosure, the time-domain position includes a start time point, and Step 203 includes:

determining a start time point of the power-saving signal occasion corresponding to a current index number.

The determining the start time point of the power-saving signal occasion corresponding to the current index number includes:

taking a time-domain start position of an $[(i\_s*x)+1]^{th}$ power-saving signal as the start time point of the power-saving signal occasion corresponding to the current index number; or looking up the start time point of the power-saving signal monitoring occasion corresponding to the current index number in accordance with a start position of each configured power-saving signal occasion, where i_s represents the index number corresponding to the power-saving signal occasion, and x represents the quantity of power-saving signals within a beam sweeping periodicity corresponding to one power-saving signal monitoring occasion.

Hence, on one hand, the time-domain start position of the $[(i\_s*x)+1]^{th}$ power-saving signal is directly taken as the start time point of the power-saving signal occasion corresponding to the current index number, and on the other hand, the start time point of the power-saving signal monitoring occasion corresponding to the current index number is looked up in accordance with the start position of each configured power-saving signal occasion.

The taking the time-domain start position of the $[(i\_s*x)+1]^{th}$ power-saving signal as the start time point of the power-saving signal occasion corresponding to the current index number includes:

taking a position t+M as the time-domain start position of the $[(i\_s*x)+1]^{th}$ power-saving signal, where M=i_s*x, and t represents a start time point of the first power-saving signal in the power-saving signal occasion corresponding to the current index number; or determining a position of each power-saving signal in each power-saving signal occasion in accordance with a duration of the power-saving signal, and a periodicity of the power-saving signal and/or a periodicity offset of the power-saving signal, and ranking the positions of the power-saving signals to obtain the time-domain start position of the $[(i\_s*x)+1]^{th}$ power-saving signal.

Here, for a slot-scale power-saving signal (one power-saving signal that occupies one complete slot), the position t+M is calculated as the position where the $[(i\_s*x)+1]^{th}$ power-saving signal occurs in conjunction with t, i_s and x.

For a symbol-scale power-saving signal (one power-saving signal that does not occupy one complete slot) or when two power-saving signals are not continuous (i.e., when the two power-saving signals are spaced apart from each other by one or more slots), the position of each power-saving signal in each power-saving signal occasion is determined in accordance with the duration of the power-saving signal and the periodicity and/or the periodicity offset of the power-saving signal, and then the positions of the power-saving signals are ranked to obtain the position where the $[(i\_s*x)+1]^{th}$ power-saving signal occurs.

The parameter t is configured by the network device or indicated by a predefined power-saving signal occasion firstpowersavingoccasion.

Figure 3:
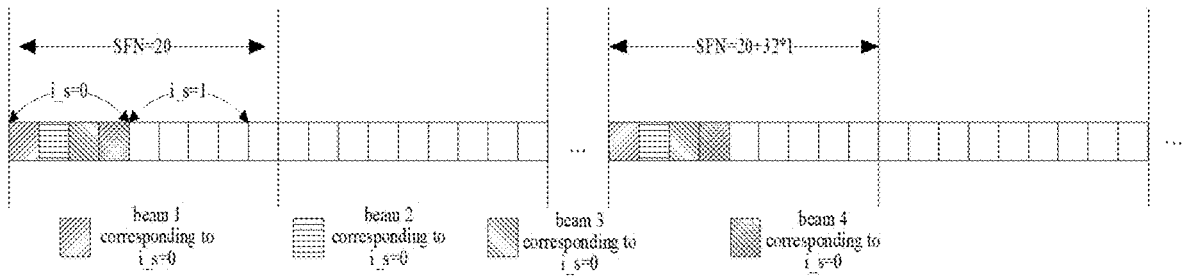
FIG. 3 is a first schematic view showing an application of the signal processing method according to an embodiment of the present disclosure.

For example, as shown in FIG. 3, in a power-saving signal radio frame with SFN=20, when the current index number i_s=0 and a start time point of a first power-saving signal is within a slot 0 (slot=0) (t=0 slot), a start time point of an $(i\_s+1)^{th}$ power-saving signal is the time-domain start position where the $[(i\_s*x)+1]^{th}$ power-saving signal occurs.

In addition, in a possible embodiment of the present disclosure, the time-domain position further includes a position of the power-saving signal occasion, wherein the obtaining the time-domain position of the power-saving signal corresponding to the index number includes:

taking, in accordance with the start time point of the time-domain position, consecutive number y*x of time lengths as the position of the power-saving signal occasion corresponding to the index number, wherein a start point of the consecutive number y*x of time lengths is the start time point of the time-domain position; or taking, in accordance with the start time point of the time-domain position, and a periodicity of the power-saving signal and/or a periodicity offset of the power-saving signal, a time-domain length of number x of power-saving signals as the position of the power-saving signal occasion corresponding to the index number, wherein a start point of the number x of power-saving signals is the start time point of the time-domain position, where y represents a duration of the power-saving signal, and x represents the quantity of power-saving signals within a beam sweeping periodicity corresponding to one power-saving signal monitoring occasion.

Figure 4:
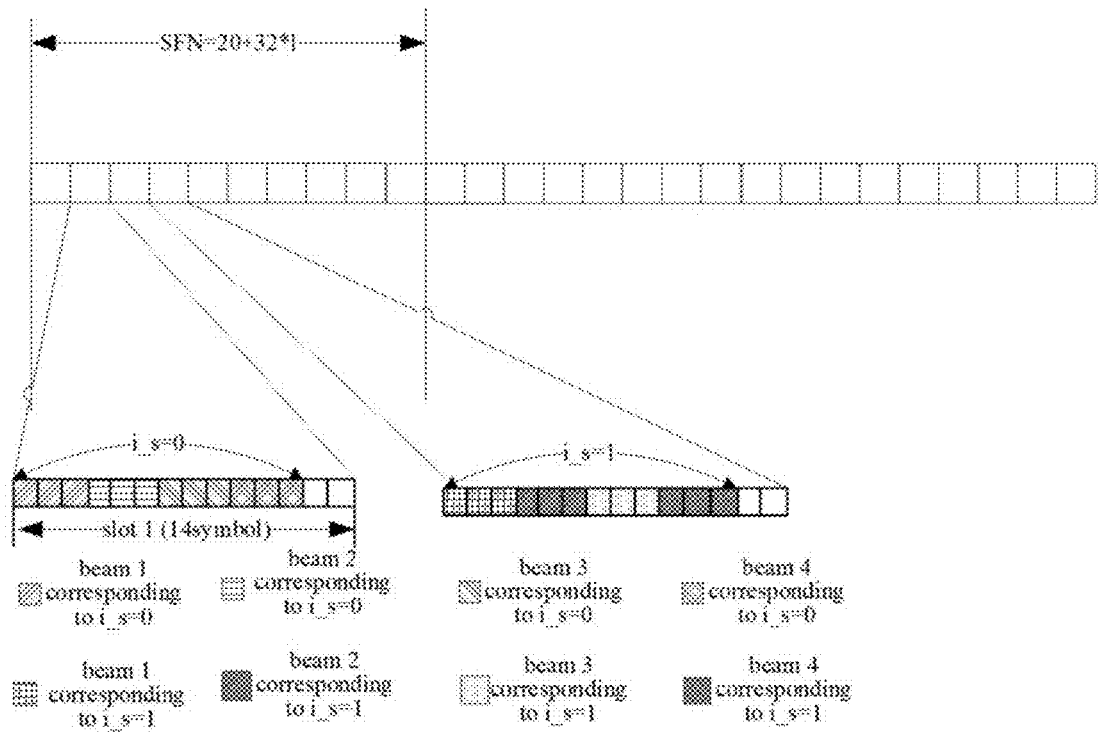
FIG. 4 is a second schematic view showing the application of the signal processing method according to an embodiment of the present disclosure.

For example, as shown in FIG. 3, x=4, and y=1 slot. In the power-saving signal radio frame with SFN=20, a power-saving signal occasion with an index number i_s=0 is slot0 to slot3 (i.e., 1*4). As shown in FIG. 4, x=4, the duration is provided with respect to a symbol, and y=3 symbols. In the power-saving signal radio frame with SFN=20, the power-saving signal occasion with the index number i_s=0 is symbol0 to symbol 11 in slot1.

In a possible embodiment of the present disclosure, the time-domain position further includes a symbol carrying the power-saving signal;

the obtaining the time-domain position of the power-saving signal corresponding to the index number includes:

determining the symbol carrying the power-saving signal in the position of the power-saving signal occasion corresponding to the index number in accordance with a symbol position of the power-saving signal.

Figure 5:
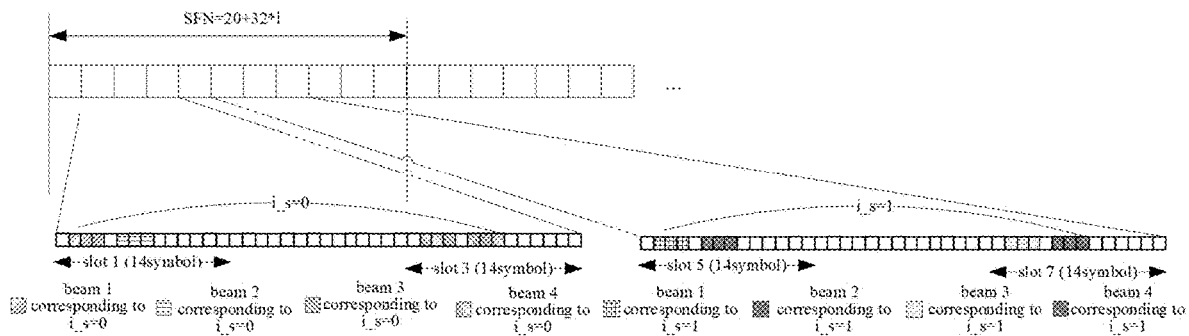
FIG. 5 is a third schematic view showing the application of the signal processing method according to an embodiment of the present disclosure.

Here, considering the circumstance where the symbol position of the power-saving signal has been configured, the symbol carrying the power-saving signal is determined within the power-saving signal occasion corresponding to the index number. For example, symbol positions of power-saving signals within one slot are 011101110000 (where 1 represents a position where the power-saving signal occurs). As shown in FIG. 5, x=4, and y=3 symbols. Within the power-saving signal radio frame with SFN=20, the power-saving signal occasion with the index number i_s=0 is symbol1 to symbol 3 and symbol5-symbol7 within slot1, and symbol1 to symbol3 and symbol5 to symbol7 within slot3.

It should be further appreciated that, a beam sweeping mode is adopted by an NR system. In order to monitor the signal with respect to a specific beam direction, in the embodiments of the present disclosure, prior to Step 102, the signal processing method further includes:

determining a target beam direction for monitoring in accordance with a beam direction of a received System Synchronization Block (SSB) and a relationship between a beam direction of the power-saving signal and the beam direction of the system synchronization block.

The relationship between the beam direction of the power-saving signal and the beam direction of the SSB is configured by the network device or predefined. It should be noted that, one beam direction of the SSB broadcast by a system may correspond to two or more beam directions of the corresponding power-saving signal, but not limited to one beam direction of the corresponding power-saving signal. For example, a beam direction 1 of the SSB broadcast by the system corresponds to a beam direction 1 of the power-saving signal, or corresponds to {the beam direction 1 of the power-saving signal and a beam direction 3 of the power-saving signal}. In this way, based on the relationship between the beam direction of the power-saving signal and the beam direction of the SSB, the UE determines a specific one or ones of the beam directions (i.e., the target beam direction) in the power-saving signal occasion upon the receipt of the beam direction of the SSB broadcast by the system.

Subsequent to determining the target beam direction being monitored, Step 102 includes:

monitoring the power-saving signal corresponding to the target beam direction in the power-saving signal occasion in accordance with the position of the power-saving signal occasion in the time-domain position.

Generally speaking, the network device transmits time-domain configuration information for configuring the power-saving signal to the UE, so that the UE determines the time-domain position for monitoring the power-saving signal in accordance with the time-domain configuration information and other predefined parameters. In the embodiments, prior to Step 101, the signal processing method further includes:

receiving the time-domain configuration information about the network device, wherein the time-domain configuration information is used to configure the time-domain position of the power-saving signal.

In a possible embodiment of the present disclosure, the time-domain configuration information includes at least one of:

a frame offset for determining a frame position where the power-saving signal occurs;

an occurring occasion for determining a start position of each power-saving signal occasion;

the quantity of power-saving signals within one beam sweeping periodicity;

a periodicity for determining a position where the power-saving signal occurs;

a periodicity offset for determining the position where the power-saving signal occurs;

a symbol position for indicating a symbol corresponding to the power-saving signal occurring within one slot or indicating that a start position of the power-saving signal corresponds to a symbol within one slot;

a duration for indicating the quantity of consecutive slots or consecutive symbols occupied by the power-saving signal;

a relationship between a beam direction of the power-saving signal and a beam direction of a system synchronization block;

a relationship that is between a periodicity of the power-saving signal and a paging periodicity and used to indicate that one power-saving signal is equal to number k of paging periodicities.

In this way, the UE is capable of determining the frame position of the power-saving signal in accordance with the time-domain configuration information for configuring the power-saving signal and the frame offset powersavingframeoffset; determines the start position of each power-saving signal monitoring occasion in accordance with the occurring occasion firstpowersavingoccasion (in unit of slot); determines the position where the power-saving signal occurs in accordance with the periodicity periodicitypowersaving (in unit of slot or symbol); determines the position where the power-saving signal occurs in accordance with the periodicity offset; determines the symbol corresponding to the power-saving signal within one slot or the symbol at a start position of the power-saving signal within one slot in accordance with the symbol position; determines the quantity of consecutive slots or consecutive symbols occupied by the power-saving signal in accordance with the duration; and determines that the power-saving signal periodicity is equal to number k of paging periodicities in accordance with the relationship between the power-saving signal periodicity and the paging periodicity.

The signal processing method in the embodiments of the present disclosure will be described hereinafter in conjunction with different scenarios.

First scenario: the UE monitors the power-saving signal once within each paging periodicity, UE_ID=5G-S-TMSI mod 1024=5, T=32, N=8, Ns=2, powersavingframeoffset=0, duration=1 slot, x=4.

At first, radio frames with SFN=20, 52, . . . , 20+32*l (l is a positive integer greater than or equal to 0) within which the power-saving signal is monitored by the UE are determined through a formula (SFN+powersavingframeoffset) mod T=(T div N)*(UE_ID mod N), i.e., SFN mod 32=(32 div 8)*(5 mod 8).

Next, i_s=floor(5/8)mod 2=0 is calculated through a formula i_s=floor (UE_ID/N) mod Ns. Hence, as shown in FIG. 3, a start time point of the power-saving signal monitoring occasion of by the UE is a first power-saving signal occasion with SFN=20+32*l (l is a positive integer greater than or equal to 0). An $(i\_s+1)^{th}$ power-saving signal occasion is a time length of consecutive x*durations with a position where an $[(i\_s*x)+1]^{th}$ power-saving signal occurs (i.e., i_s*x slots) as a start point, so a first power-saving signal occasion is determined as consecutive four (i.e., 1*4) slots, corresponding to slot0 to slot3 in FIG. 3, with a time point where a first power-saving signal occurs (i.e., slot0) as a start point. Further, when the beam sweeping mode is adopted, the quantity x of the power-saving signals within one sweeping period correspond to the beam directions of the SSB broadcast by the system respectively. For example, a beam direction 1 of the SSB broadcast by the system corresponds to a beam direction 1 of the power-saving signal, or corresponds to {the beam direction 1 of the power-saving signal and a beam direction 3 of the power-saving signal}. Based on the correspondence, the UE determines a specific one or ones of the beams to be monitored in the power-saving signal occasion upon the receipt of the beam direction of the SSB broadcast by the system. When the UE has received the beam direction 1 of the SSB broadcast by the system, the UE merely needs to monitor the beam direction 1 of the power-saving signal, or {the beam directions 1 and 3 of the power-saving signal}, in the power-saving signal occasion. With respect to the above-mentioned specific configuration, the UE merely needs to monitor slot1, or {slot 1 and slot 3}, in the power-saving signal occasion.

Figure 6:
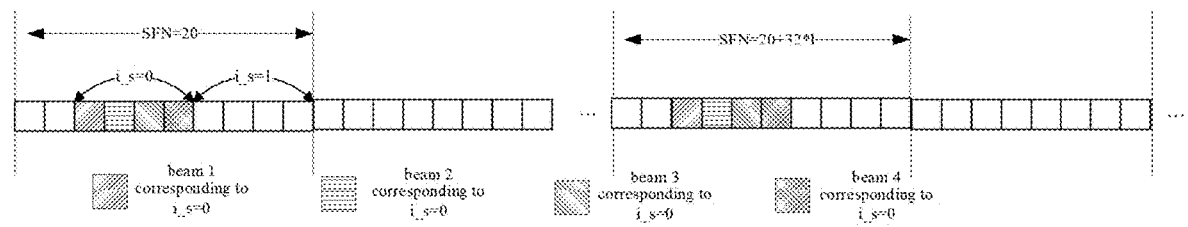
FIG. 6 is a fourth schematic view showing the application of the signal processing method according to an embodiment of the present disclosure.

It should be noted that, in the above content, the power-saving signal occasion (firstpowersavingoccasion) is equal to 0 by default. When firstpowersavingoccasion is not equal to 0 and an offset of firstpowersavingoccasion is 2 slots, as shown in FIG. 6, the first power-saving signal occasion is consecutive 4 (i.e., 1*4) slots with firstpowersavingoccasion (i.e., slot2) as a start point.

Second scenario: the UE monitors the power-saving signal once within each paging periodicity, UE_ID=5G-S-TMSI mod 1024=5, T=32, N=8, Ns=2, powersavingframeoffset=0, duration=3 symbols, and x=4. In addition, the periodicity and the periodicity offset of the power-saving signal are configured by the network device or predefined, periodicity=2 slots, and periodicity offset=1 slot.

Radio frames with SFN=20, 52, . . . , 20+32*l (l is a positive integer greater than or equal to 0) within which the power-saving signal is monitored by the UE are determined through a formula (SFN+powersavingframeoffset) mod T=(T div N)*(UE_ID mod N), i.e., SFN mod 32=(32 div 8)*(5 mod 8).

Next, $i\_s=floor(5/8) \bmod 2=0$ is calculated through a formula $i\_s=floor(UE\_ID/N) \bmod Ns$. An $(i\_s*+1)^{th}$ power-saving signal occasion is a time length of consecutive x*durations with a start position of an $[(i\_s*x)+1]^{th}$ power-saving signal as a start point. The start position of the $[(i\_s*x)+1]^{th}$ power-saving signal is determined in accordance with a duration of the power-saving signal, and a periodicity of the power-saving signal and/or a periodicity offset of the power-saving signal, to determine a position of each power-saving signal in each power-saving signal occasion. Then, the positions of the power-saving signals are ranked to obtain the time-domain start position of the $[(i\_s*x)+1]^{th}$ power-saving signal. Hence, as shown in FIG. 4, a start time point of the power-saving signal monitoring occasion of the UE is a first power-saving signal occasion with SFN=20+32*l (l is a positive integer greater than or equal to 0). The first power-saving signal occasion is consecutive 12 (i.e., 4*3) symbols with a first symbol in slot=1 as a start point, i.e., the power-saving signal monitoring occasion with the index number i_s=0 is symbol0 to symbol11 in slot1. Identically, when the beam sweeping mode is adopted, the quantity x of the power-saving signals within one sweeping period correspond to the beam directions of the SSB broadcast by the system respectively. For example, a beam direction 1 of the SSB broadcast by the system corresponds to a beam direction 1 of the power-saving signal, or corresponds to {the beam direction 1 and a beam direction 3 of the power-saving signal}. Based on the correspondence, the UE determines a specific one or ones of the beams to be monitored in the power-saving signal occasion upon the receipt of the beam direction of the SSB broadcast by the system. When the UE has received the beam direction 1 of the SSB broadcast by the system, the UE merely needs to monitor the beam direction 1 of the power-saving signal (i.e., symbol0 to symbol2 in slot1), or {the beam directions 1 and 3 of the power-saving signal} (i.e., symbol0 to symbol2 and symbol6 to symbol8 in slot1), in the power-saving signal occasion.

Third scenario: the UE monitors the power-saving signal once within each paging periodicity, UE_ID=5G-S-TMSI mod 1024=5, T=32, N=8, Ns=2, powersavingframeoffset=0, duration=3 symbols, and x=4. In addition, the periodicity and the periodicity offset of the power-saving signal and the position of the symbol (powersavingsymbolsinslot) are configured by the network device or predefined, periodicity=2 slots, periodicity offset=1 slot, and powersavingsymbolsinslot=011101110000 (1 represents a position where the power-saving signal occurs).

In this way, radio frames with SFN=20, 52, . . . , 20+32*l (l is a positive integer greater than or equal to 0) within which the power-saving signal is monitored by the UE are determined through a formula (SFN+powersavingframeoffset) mod T=(T div N)*(UE_ID mod N), i.e., SFN mod 32=(32 div 8)*(5 mod 8).

Next, $i\_s=floor(5/8) \bmod 2=0$ is calculated through a formula $i\_s=floor(UE\_ID/N) \bmod Ns$. An $(i\_s+1)^{th}$ power-saving signal occasion is a time-domain length of number x of power-saving signals after a start position of the $[(i\_s*x)+1]^{th}$ power-saving signal as a start point. A position of each power-saving signal in each power-saving signal occasion is determined in accordance with a duration of the power-saving signal, and a periodicity of the power-saving signal and/or a periodicity offset of the power-saving signal. Then, the positions of the power-saving signals are ranked to obtain the time-domain start position of the $[(i\_s*x)+1]^{th}$ power-saving signal. In addition, the UE determines a symbol carrying the power-saving signal at a time-domain position of the power-saving signal occasion corresponding to the index number in accordance with the symbol position of the power-saving signal. Hence, as shown in FIG. 5, a start time point of the power-saving signal monitoring occasion of the UE is a first power-saving signal occasion with SFN=20+32*l (l is a positive integer greater than or equal to 0). The first power-saving signal occasion is symbol positions of the power-saving signals within slot=1 and slot=3, i.e., symbol1 to symbol3 and symbol5 to symbol7 within slot1 and symbol1 to symbol3 and symbol5 to symbol7 in slot3. Identically, when the beam sweeping mode is adopted, the quantity x of the power-saving signals within one sweeping period correspond to the beam directions of the SSB broadcast by the system respectively. For example, a beam direction 1 of the SSB broadcast by the system corresponds to a beam direction 1 of the power-saving signal, or corresponds to {the beam direction 1 and a beam direction 3 of the power-saving signal}. Based on the correspondence, the UE determines a specific one or ones of the beams to be monitored in the power-saving signal occasion upon the receipt of the beam direction of the SSB broadcast by the system. When the UE has received the beam direction 1 of the SSB broadcast by the system, the UE merely needs to monitor the beam direction 1 of the power-saving signal (i.e., symbol1 to symbol3 in slot1), or {the beam directions 1 and 3 of the power-saving signal} (i.e., symbol1 to symbol3 in slot1 and symbol1 to symbol3 in slot3), in the power-saving signal occasion.

Fourth Scenario: the UE monitors the power-saving signal once within each paging periodicity, UE_ID=5G-S-TMSI mod 1024=13, T=32, N=8, Ns=2, powersavingframeoffset=0, duration=3 symbols, x=4, periodicity=2 slots, periodicity offset=1 slot, and powersavingsymbolsinslot=011101110000 (1 represents a position of the power-saving signal). As shown in FIG. 7, a start time point of a first power-saving signal occasion within one paging radio frame is slot=1, and a start time point of a second power-saving signal occasion is slot=7.

In this way, radio frames with SFN=20, 52, . . . , 20+32*l (l is a positive integer greater than or equal to 0) within which the power-saving signal is monitored by the UE are determined through a formula (SFN+powersavingframeoffset) mod T=(T div N)*(UE_ID mod N), i.e., SFN mod 32=(32 div 8)*(5 mod 8).

Next, i_s=floor(13/8)mod 2=1 is calculated through a formula i_s=floor (UE_ID/N) mod Ns. Hence, as shown in FIG. 7, a start time point of the power-saving signal monitoring occasion of the UE is a second power-saving signal occasion (i_s=1) with SFN=20+32*l (l is a positive integer greater than or equal to 0), and the second power-saving signal occasion is symbol positions of the power-saving signals within slot=7 and slot=9. Identically, when the beam sweeping mode is adopted, the quantity x of the power-saving signals within one sweeping period correspond to the beam directions of the SSB broadcast by the system respectively. For example, a beam direction 1 of the SSB broadcast by the system corresponds to a beam direction 1 of the power-saving signal, or corresponds to {the beam direction 1 and a beam direction 3 of the power-saving signal}. Based on the correspondence, the UE determines a specific one or ones of the beams to be monitored in the power-saving signal occasion upon the receipt of the beam direction of the SSB broadcast by the system. When the UE has received the beam direction 1 of the SSB broadcast by the system, the UE merely needs to monitor the beam direction 1 of the power-saving signal, or {the beam directions 1 and 3 of the power-saving signal}, in the power-saving signal occasion.

It should be appreciated that, in the embodiments of the present disclosure, when the power-saving signal periodicity configured by the network device or predefined is equal to number k of paging periodicities and the UE has monitored one power-saving signal in accordance with the configuration, it means that the UE needs to monitor number k of subsequent paging until a paging message has been monitored. When no power-saving signal has been monitored in accordance with the configuration, it means that the UE does not need to monitor the k subsequent paging. In other words, the periodicity with which the UE monitors the power-saving signal is k times of the monitoring of the paging periodicity. Hence, a condition for the UE to determine the radio frame for monitoring the power-saving signal is changed to (SFN+powersavingframeoffset) mod (k*T)=(T div N)*(UE_ID mod N). The UE determines the index number i_s corresponding to the power-saving signal monitoring occasion and the time-domain position occupied by the (i_s+1)$^{th}$ power-saving signal occasion in the abovementioned modes, which will not be particularly defined herein.

In a word, according to the signal processing method in the embodiments of the present disclosure, the time-domain position for monitoring the power-saving signal is determined at first, so it is able to effectively monitor the power-saving signal at the time-domain position, thereby to achieve a power-saving effect.

As shown in FIG. 8, the present disclosure further provides in some embodiments a signal processing method, which includes:

Step 801 of transmitting time-domain configuration information, wherein the time-domain configuration information is used to configure a time-domain position of the power-saving signal.

Through this step, it is able for a UE to determine the time-domain position of the power-saving signal in accordance with the received time-domain configuration information, thereby to monitor the power-saving signal effectively.

In a possible embodiment of the present disclosure, the time-domain configuration information includes at least one of:
  a frame offset for determining a frame position where the power-saving signal occurs;
  an occurring occasion for determining a start position of each occasion where the power-saving signal occurs;
  the quantity of power-saving signals within one beam sweeping periodicity;
  a periodicity for determining a position where the power-saving signal occurs;
  a periodicity offset for determining the position where the power-saving signal occurs;
  a symbol position for indicating a symbol corresponding to the power-saving signal occurring within one slot or indicating that a start position of the power-saving signal corresponds to a symbol within one slot;
  a duration for indicating the quantity of consecutive slots or consecutive symbols occupied by the power-saving signal;
  a relationship between a beam direction of the power-saving signal and a beam direction of a system synchronization block;
  a relationship that is between a periodicity of the power-saving signal and a paging periodicity and used to indicate that one power-saving signal is equal to number k of paging periodicities.

In a possible embodiment of the present disclosure, the signal processing method further includes:
  transmitting the power-saving signal in accordance with the time-domain configuration information.

It should be appreciated that, the method is used to cooperate with the above-mentioned signal processing method for the UE to monitor the power-saving signal, and the embodiments involving the signal processing method for the UE is also adapted to this method with a same technical effect.

As shown in FIG. 9, the present disclosure further provides in some embodiments a UE, which includes a transceiver 920, a memory 930, a processor 910, and a program stored in the memory 930 and executed by the processor 910;
  the processor 910 is configured to execute the program:
  determine a time-domain position for monitoring a power-saving signal; and
  monitor the power-saving signal in accordance with the time-domain position.

The processor is further configured to execute the program to:
  obtain each radio frame corresponding to the power-saving signal;
  obtain an index number corresponding to a power-saving signal monitoring occasion, wherein the index number is a logic serial number corresponding to a power-saving signal monitoring occasion among all power-saving signal occasions within one paging periodicity or one power-saving signal periodicity, and a start point of each of the all power-saving signal occasions is the respective radio frame; and obtain the time-domain position of the power-saving signal corresponding to the index number.

The processor is further configured to execute the program to:

when the power-saving signal periodicity is equal to the paging periodicity, obtain an SFN corresponding to the power-saving signal through a formula (SFN+powersavingframeoffset) mod T=(T div N)*(UE_ID mod N); and when the power-saving signal periodicity is equal to number k of paging periodicities, obtain the SFN corresponding to the power-saving signal through a formula (SFN+powersavingframeoffset) mod (k*T) =(T div N)*(UE_ID mod N), where k is an integer greater than 1, wherein powersavingframeoffset represents a frame offset of the power-saving signal, T represents the paging periodicity, N represents the quantity of paging radio frames within one paging periodicity, and UE_ID=S-TMSI mod 1024.

The processor is further configured to execute the program to:

take an SFN corresponding to a paging monitoring occasion as the SFN corresponding to the power-saving signal.

The processor is further configured to execute the program to:

obtain an index number i_s through a formula i_s=floor (UE_ID/N) mod Ns, where Ns represents the quantity of paging occasions associated with one paging radio frame, and UE_ID=S-TMSI mod 1024.

The time-domain position includes a start time point; the processor is further configured to execute the program to:

determine a start time point of the power-saving signal occasion corresponding to a current index number.

The processor is further configured to execute the program to:

take a time-domain start position of an $[(i\_s*x)+1]^{th}$ power-saving signal as the start time point of the power-saving signal occasion corresponding to the current index number; or look up the start time point of the power-saving signal monitoring occasion corresponding to the current index number in accordance with a start position of each configured power-saving signal occasion, where i_s represents the index number corresponding to the power-saving signal occasion, and x represents the quantity of power-saving signals within a beam sweeping periodicity corresponding to one power-saving signal monitoring occasion.

The processor is further configured to execute the program to:

take a position t+M as the time-domain start position of the $[(i\_s*x)+1]^{th}$ power-saving signal, where M=i_s*x, and t represents a start time point of the first power-saving signal in the power-saving signal occasion corresponding to the current index number; or determine a position of each power-saving signal in each power-saving signal occasion in accordance with a duration of the power-saving signal, and a periodicity of the power-saving signal and/or a periodicity offset of the power-saving signal, and rank the positions of the power-saving signals to obtain the time-domain start position of the $[(i\_s*x)+1]^{th}$ power-saving signal.

The time-domain position further includes a position of the power-saving signal occasion, wherein the processor is further configured to execute the program to:

take, in accordance with the start time point of the time-domain position, consecutive number y*x of time lengths as the position of the power-saving signal occasion corresponding to the index number, wherein a start point of the consecutive number y*x of time lengths is the start time point of the time-domain position; or take, in accordance with the start time point of the time-domain position, and a periodicity of the power-saving signal and/or a periodicity offset of the power-saving signal, a time-domain length of number x of power-saving signals as the position of the power-saving signal occasion corresponding to the index number, wherein a start point of the number x of power-saving signals is the start time point of the time-domain position, where y represents a duration of the power-saving signal, and x represents the quantity of power-saving signals within a beam sweeping periodicity corresponding to one power-saving signal monitoring occasion.

The time-domain position further includes a symbol carrying the power-saving signal;

the processor is further configured to execute the program to:

determine the symbol carrying the power-saving signal in the position of the power-saving signal occasion corresponding to the index number in accordance with a symbol position of the power-saving signal.

The processor is further configured to execute the program to:

determine a target beam direction for monitoring the power-saving signal in accordance with a beam direction of a received system synchronization block, and a relationship between a beam direction of the power-saving signal and the beam direction of the system synchronization block.

The processor is further configured to execute the program to:

monitor the power-saving signal corresponding to the target beam direction in the power-saving signal occasion in accordance with the position of the power-saving signal occasion in the time-domain position.

The processor is further configured to execute the program to:

receive time-domain configuration information of a network device, wherein the time-domain configuration information is used to configure the time-domain position of the power-saving signal.

The time-domain configuration information includes at least one of:

a frame offset for determining a frame position where the power-saving signal occurs;

an occurring occasion for determining a start position of each power-saving signal occasion;

the quantity of power-saving signals within one beam sweeping periodicity;

a periodicity for determining a position where the power-saving signal occurs;

a periodicity offset for determining the position where the power-saving signal occurs;

a symbol position for indicating a symbol corresponding to the power-saving signal occurring within one slot or indicating that a start position of the power-saving signal corresponds to a symbol within one slot;

a duration for indicating the quantity of consecutive slots or consecutive symbols occupied by the power-saving signal;

a relationship between a beam direction of the power-saving signal and a beam direction of a system synchronization block;

a relationship that is between a periodicity of the power-saving signal and a paging periodicity and used to indicate that one power-saving signal is equal to number k of paging periodicities.

In FIG. 9, bus architecture includes a number of buses and bridges connected to each other, so as to connect various circuits for one or more processors represented by the processor 910 and one or more memories represented by the memory 930. In addition, as is known in the art, the bus architecture is used to connect any other circuits, such as a circuit for a peripheral device, a circuit for a voltage stabilizer and a power management circuit, which will not be further defined herein. A bus interface is provided, and the transceiver 920 consists of a plurality of elements, i.e., a transmitter and a receiver for communication with any other devices over a transmission medium. With respect to different UEs, a user interface 940 is also be provided for devices which are to be arranged inside or outside the UE, and these devices include but not limited to a keypad, a display, a speaker, a microphone and a joystick.

The processor 910 takes charge of managing the bus architecture as well as general processings, and the memory 930 stores therein data for the operation of the processor 910.

In a possible embodiment of the present disclosure, the processor 910 is a Central Processing Unit (CPU), an Application Specific Integrated Circuits (ASIC), a Field-Programmable Gate Array (FPGA) or a Complex Programmable Logic Device (CPLD).

As shown in FIG. 10, the present disclosure further provides in some embodiments a UE, which includes a transceiver 1020, a memory 1030, a processor 1010, and a computer program stored in the memory 1030 and executed by the processor 1010;

wherein the processor is configured to execute the program to:

transmit time-domain configuration information, wherein the time-domain configuration information is used to configure a time-domain position of the power-saving signal.

The time-domain configuration information includes at least one of:

a frame offset for determining a frame position where the power-saving signal occurs;

an occurring occasion for determining a start position of each power-saving signal occasion;

the quantity of power-saving signals within one beam sweeping periodicity;

a periodicity for determining a position where the power-saving signal occurs;

a periodicity offset for determining the position where the power-saving signal occurs;

a symbol position for indicating a symbol corresponding to the power-saving signal occurring within one slot or indicating that a start position of the power-saving signal corresponds to a symbol within one slot;

a duration for indicating the quantity of consecutive slots or consecutive symbols occupied by the power-saving signal;

a relationship between a beam direction of the power-saving signal and a beam direction of a system synchronization block;

a relationship that is between a periodicity of the power-saving signal and a paging periodicity and used to indicate that one power-saving signal is equal to number k of paging periodicities.

The processor is further configured to execute the program to:

transmit the power-saving signal in accordance with the time-domain configuration information.

The transceiver 1020 is configured to receive and transmit data under the control of the processor 1010. In FIG. 10, bus architecture includes a number of buses and bridges connected to each other, so as to connect various circuits for one or more processors represented by the processor 1010 and one or more memories represented by the memory 1030. In addition, as is known in the art, the bus architecture is used to connect any other circuits, such as a circuit for a peripheral device, a circuit for a voltage stabilizer and a power management circuit, which will not be further defined herein. A bus interface is provided, and the transceiver 1020 consists of a plurality of elements, i.e., a transmitter and a receiver for communication with any other devices over a transmission medium. The processor 1010 takes charge of managing the bus architecture as well as general processings, and the memory 1030 stores therein data for the operation of the processor 1010.

The present disclosure further provides in some embodiments a signal processing apparatus, which includes:

a processing module configured to determine a time-domain position for monitoring a power-saving signal; and a monitoring module configured to monitor the power-saving signal in accordance with the time-domain position.

The processing module includes:

a first obtaining sub-module configured to obtain each radio frame corresponding to the power-saving signal;

a second obtaining sub-module configured to obtain an index number corresponding to a power-saving signal monitoring occasion, wherein the index number is a logic serial number corresponding to a power-saving signal monitoring occasion among all power-saving signal occasions within one paging periodicity or one power-saving signal periodicity, and a start point of each of the all power-saving signal occasions is the respective radio frame; and a third obtaining sub-module configured to obtain the time-domain position of the power-saving signal corresponding to the index number.

The first obtaining sub-module is further configured to:

when the power-saving signal periodicity is equal to the paging periodicity, obtain an SFN corresponding to the power-saving signal through a formula (SFN+powersavingframeoffset) mod T=(T div N)*(UE_ID mod N); and when the power-saving signal periodicity is equal to number k of paging periodicities, obtain the SFN corresponding to the power-saving signal through a formula (SFN+powersavingframeoffset) mod (k*T)= (T div N)*(UE_ID mod N), where k is an integer greater than 1, wherein powersavingframeoffset represents a frame offset of the power-saving signal, T represents the paging periodicity, N represents the quantity of paging radio frames within one paging periodicity, and UE_ID=S-TMSI mod 1024.

The first obtaining sub-module is further configured to:
take an SFN corresponding to a paging monitoring occasion as the SFN corresponding to the power-saving signal.

The second obtaining sub-module is further configured to:
obtain an index number i_s through a formula i_s=floor (UE_ID/N) mod Ns, where Ns represents the quantity of paging occasions associated with one paging radio frame, and UE_ID=S-TMSI mod 1024.

The time-domain position includes a start time point;
the third obtaining sub-module includes:
a first processing unit configured to determine a start time point of the power-saving signal occasion corresponding to a current index number.

The first processing unit is further configured to:
take a time-domain start position of an $[(i\_s*x)+1]^{th}$ power-saving signal as the start time point of the power-saving signal occasion corresponding to the current index number; or
look up the start time point of the power-saving signal monitoring occasion corresponding to the current index number in accordance with a start position of each configured power-saving signal occasion,
where i_s represents the index number corresponding to the power-saving signal occasion, and x represents the quantity of power-saving signals within a beam sweeping periodicity corresponding to one power-saving signal monitoring occasion.

The first processing unit is further configured to:
take a position t+M as the time-domain start position of the $[(i\_s*x)+1]^{th}$ power-saving signal, where M=i_s*x, and t represents a start time point of the first power-saving signal in the power-saving signal occasion corresponding to the current index number; or
determine a position of each power-saving signal in each power-saving signal occasion in accordance with a duration of the power-saving signal, and a periodicity of the power-saving signal and/or a periodicity offset of the power-saving signal, and rank the positions of the power-saving signals to obtain the time-domain start position of the $[(i\_s*x)+1]^{th}$ power-saving signal.

The time-domain position further includes a position of the power-saving signal occasion,
wherein the third obtaining sub-module is further configured to:
take, in accordance with the start time point of the time-domain position, consecutive number y*x of time lengths as the position of the power-saving signal occasion corresponding to the index number, wherein a start point of the consecutive number y*x of time lengths is the start time point of the time-domain position; or
take, in accordance with the start time point of the time-domain position, and a periodicity of the power-saving signal and/or a periodicity offset of the power-saving signal, a time-domain length of number x of power-saving signals as the position of the power-saving signal occasion corresponding to the index number, wherein a start point of the number x of power-saving signals is the start time point of the time-domain position,
where y represents a duration of the power-saving signal, and x represents the quantity of power-saving signals within a beam sweeping periodicity corresponding to one power-saving signal monitoring occasion.

The time-domain position further includes a symbol carrying the power-saving signal;
the third obtaining sub-module includes:
a second processing unit configured to determine the symbol carrying the power-saving signal in the position of the power-saving signal occasion corresponding to the index number in accordance with a symbol position of the power-saving signal.

The signal processing apparatus further includes:
a beam direction determination module configured to determine a target beam direction for monitoring the power-saving signal in accordance with a beam direction of a received system synchronization block, and a relationship between a beam direction of the power-saving signal and the beam direction of the system synchronization block.

The monitoring module is further configured to:
monitor the power-saving signal corresponding to the target beam direction in the power-saving signal occasion in accordance with the position of the power-saving signal occasion in the time-domain position.

The signal processing apparatus further includes:
a reception module configured to receive time-domain configuration information of a network device, wherein the time-domain configuration information is used to configure the time-domain position of the power-saving signal.

The time-domain configuration information includes at least one of:
a frame offset for determining a frame position where the power-saving signal occurs;
an occurring occasion for determining a start position of each power-saving signal occasion;
the quantity of power-saving signals within one beam sweeping periodicity;
a periodicity for determining a position where the power-saving signal occurs;
a periodicity offset for determining the position where the power-saving signal occurs;
a symbol position for indicating a symbol corresponding to the power-saving signal occurring within one slot or indicating that a start position of the power-saving signal corresponds to a symbol within one slot;
a duration for indicating the quantity of consecutive slots or consecutive symbols occupied by the power-saving signal;
a relationship between a beam direction of the power-saving signal and a beam direction of a system synchronization block;
a relationship that is between a periodicity of the power-saving signal and a paging periodicity and used to indicate that one power-saving signal is equal to number k of paging periodicities.

It should be appreciated that, the signal processing apparatus is used to implement the above-mentioned signal processing method for the UE, and the embodiments involving the signal processing method for the UE is also adapted to this apparatus with a same technical effect.

The present disclosure further provides in some embodiments a signal processing apparatus, which includes:
a transmission module configured to transmit time-domain configuration information, wherein the time-domain configuration information is used to configure a time-domain position of the power-saving signal.

The time-domain configuration information includes at least one of:
- a frame offset for determining a frame position where the power-saving signal occurs;
- an occurring occasion for determining a start position of each power-saving signal occasion;
- the quantity of power-saving signals within one beam sweeping periodicity;
- a periodicity for determining a position where the power-saving signal occurs;
- a periodicity offset for determining the position where the power-saving signal occurs;
- a symbol position for indicating a symbol corresponding to the power-saving signal occurring within one slot or indicating that a start position of the power-saving signal corresponds to a symbol within one slot;
- a duration for indicating the quantity of consecutive slots or consecutive symbols occupied by the power-saving signal;
- a relationship between a beam direction of the power-saving signal and a beam direction of a system synchronization block;
- a relationship that is between a periodicity of the power-saving signal and a paging periodicity and used to indicate that one power-saving signal is equal to number k of paging periodicities.

The signal processing apparatus further includes:
- a signal transmission module configured to transmit the power-saving signal in accordance with the time-domain configuration information.

It should be appreciated that, the signal processing apparatus is used to implement the above-mentioned signal processing method for the network device, and the embodiments involving the signal processing method for the network device is also adapted to this apparatus with a same technical effect.

The present disclosure further provides in some embodiments a computer-readable storage medium storing therein a program. The program is executed by a processor so as to implement steps of the above-mentioned signal processing method for the UE.

The present disclosure further provides in some embodiments a computer-readable storage medium storing therein a program. The program is executed by a processor so as to implement steps of the above-mentioned signal processing method for the network device.

The computer-readable storage medium includes volatile or nonvolitle, mobile or immobile storage medium capable of storing therein information using any method or technique. The information is a computer-readable instruction, a data structure, a program or any other data. The computer-readable storage medium includes, but not limited to, a Random Access Memory (e.g., Phase Change Random Access Memory (PRAM), Static Random Access Memory (SRAM) or Dynamic Random Access Memory (DRAM)), a Read Only Memory (ROM) (e.g., an Electrically Erasable Programmable Read Only Memory (EEPROM), a flash memory, a Compact Disc Read Only Memory (CD-ROM) or a Digital Video Disk (DVD)), a magnetic storage device (e.g., a cassette magnetic tape or a magnetic disk), or any other non-transmission medium capable of storing therein information which can be accessed by a computing device. As defined in the embodiments of the present disclosure, the computer-readable storage medium does not include any transitory media, e.g., modulated data signal or carrier.

It should be further appreciated that, the UE described in the specification includes, but not limited to, smart phone or tablet computer. The functional members described in the specification are referred to as modules, so as to emphasize the independence of the implementation in a more particular manner.

In the embodiments of the present disclosure, the modules may be implemented by software, so as to be executed by various processors. For example, an identified, executable code module includes one or more physical or logical blocks including computer instructions, and the module is constructed as an object, a process or a function. Even so, the executable codes of the identified modules are unnecessary to be physically located together, but include different instructions stored in different locations. When these instructions are logically combined together, they form the modules and achieve the prescribed purposes of the modules.

Actually, the executable code module is a single instruction or a plurality of instructions, and even it is distributed at different code segments, in different programs, or across a plurality of memory devices. Also, operational data is identified in the modules, implemented in any appropriate form, and organized in any data structure of an appropriate type. The operational data is collected as a single data set, or distributed at different locations (including different memory devices), and it is at least partially present in a system or network merely as an electronic signal.

When the modules can be implemented by software, considering the hardware level in the related art, a person skilled in the art can build a corresponding hardware circuit to achieve the corresponding function if taking no account of the cost. The hardware circuit includes a conventional very-large-scale integration (VLSI) circuit, a gate array, a semiconductor such as a logic chip and a transistor, or other discrete components in the related art. The modules are further implemented by a programmable hardware device, such as a field-programmable gate array, a programmable array logic device and a programmable logic device.

The above illustrative embodiments have been described with respect to the drawings, and the other embodiments are also feasible without departing from the spirit and teaching of the present disclosure, so the illustrative embodiments shall not be used to limit the scope of the present disclosure. More definitely, the illustrative embodiments are provided so as to make the present disclosure complete, and deliver the scope of the present disclosure to those skilled in the art. In the drawings, sizes and relative sizes of the members are scaled up for clarification. Terms involved in the present disclosure may be merely used to describing the specific embodiments, but shall not be inclined to become a restricted use. Unless otherwise defined, such words as "one" or "one of" are merely used to represent the existence of at least one member, rather than to limit the number thereof. Such words as "include" or "including" intend to indicate that there are the features, integers, steps, operations, elements and/or assemblies, without excluding the existence or addition of one or more other features, integers, steps, operations, elements, assemblies and/or combinations thereof. Unless otherwise defined, a numerical range includes an upper limit, a lower limit and any sub-range.

The above embodiments are optional, but the present disclosure is not limited thereto. It should be appreciated that, a person skilled in the art may make further modifications and improvements without departing from the principle of the present disclosure, and these modifications and improvements shall also fall within the scope of the present disclosure.

What is claimed is:

1. A signal processing method performed by a User Equipment (UE), comprising:
   determining a time-domain position for monitoring a power-saving signal;
   monitoring the power-saving signal in accordance with the time-domain position,
   wherein the determining the time-domain position for monitoring the power-saving signal comprises:
   obtaining each radio frame corresponding to the power-saving signal;
   obtaining an index number corresponding to a power-saving signal occasion, wherein the index number is a logic serial number corresponding to a power-saving signal monitoring occasion among all power-saving signal occasions within one paging periodicity or one power-saving signal periodicity, and a start point of each of the all power-saving signal occasions is the respective radio frame; and
   obtaining the time-domain position of the power-saving signal corresponding to the index number.

2. The signal processing method according to claim 1, wherein the obtaining the radio frame corresponding to the power-saving signal comprises:
   when the power-saving signal periodicity is equal to the paging periodicity, obtaining a System Frame Number (SFN) corresponding to the power-saving signal through a formula (SFN+powersavingframeoffset) mod T=(T div N)*(UE_ID mod N); and
   when the power-saving signal periodicity is equal to number k of paging periodicities, obtaining the SFN corresponding to the power-saving signal through a formula (SFN+powersavingframeoffset) mod (k*T) =(T div N)*(UE_ID mod N), where k is an integer greater than 1,
   wherein powersavingframeoffset represents a frame offset of the power-saving signal, T represents the paging periodicity, N represents the quantity of paging radio frames within one paging periodicity, and UE_ID=Serving-Temporary Mobile Subscriber Identity (S-TMSI) mod 1024.

3. The signal processing method according to claim 1, wherein the obtaining the radio frame corresponding to the power-saving signal comprises:
   taking a System Frame Number (SFN) corresponding to a paging monitoring occasion as the SFN corresponding to the power-saving signal.

4. The signal processing method according to claim 1, wherein the obtaining the index number corresponding to the power-saving signal monitoring occasion comprises:
   obtaining an index number i_s through a formula i_s=floor (UE_ID/N) mod Ns, where Ns represents the quantity of paging occasions associated with one paging radio frame, and UE_ID=Serving-Temporary Mobile Subscriber Identity (S-TMSI) mod 1024.

5. The signal processing method according to claim 1, wherein the time-domain position comprises a start time point;
   the obtaining the time-domain position of the power-saving signal corresponding to the index number comprises:
   determining a start time point of the power-saving signal occasion corresponding to a current index number.

6. The signal processing method according to claim 5, wherein the determining the start time point of the power-saving signal occasion corresponding to the current index number comprises:
   taking a time-domain start position of an $[(i\_s*x)+1]^{th}$ power-saving signal as the start time point of the power-saving signal occasion corresponding to the current index number; or
   looking up the start time point of the power-saving signal monitoring occasion corresponding to the current index number in accordance with a start position of each configured power-saving signal occasion,
   where i_s represents the index number corresponding to the power-saving signal occasion, and x represents the quantity of power-saving signals within a beam sweeping periodicity corresponding to one power-saving signal monitoring occasion.

7. The signal processing method according to claim 6, wherein the taking the time-domain start position of the $[(i\_s*x)+1]^{th}$ power-saving signal as the start time point of the power-saving signal occasion corresponding to the current index number comprises:
   taking a position t+M as the time-domain start position of the $[(i\_s*x)+1]^{th}$ power-saving signal, where M=i_s*x, and t represents a start time point of the first power-saving signal in the power-saving signal occasion corresponding to the current index number; or
   determining a position of each power-saving signal in each power-saving signal occasion in accordance with a duration of the power-saving signal, and a periodicity of the power-saving signal and/or a periodicity offset of the power-saving signal, and ranking the positions of the power-saving signals to obtain the time-domain start position of the $[(i\_s*x)+1]^{th}$ power-saving signal.

8. The signal processing method according to claim 5, wherein the time-domain position further comprises a position of the power-saving signal occasion,
   wherein the obtaining the time-domain position of the power-saving signal corresponding to the index number comprises:
   taking, in accordance with the start time point of the time-domain position, consecutive number y*x of time lengths as the position of the power-saving signal occasion corresponding to the index number, wherein a start point of the consecutive number y*x of time lengths is the start time point of the time-domain position; or
   taking, in accordance with the start time point of the time-domain position, and a periodicity of the power-saving signal and/or a periodicity offset of the power-saving signal, a time-domain length of number x of power-saving signals as the position of the power-saving signal occasion corresponding to the index number, wherein a start point of the number x of power-saving signals is the start time point of the time-domain position,
   where y represents a duration of the power-saving signal, and x represents the quantity of power-saving signals within a beam sweeping periodicity corresponding to one power-saving signal monitoring occasion.

9. The signal processing method according to claim 8, wherein the time-domain position further comprises a symbol carrying the power-saving signal;
   the obtaining the time-domain position of the power-saving signal corresponding to the index number comprises:
   determining the symbol carrying the power-saving signal in the position of the power-saving signal occasion corresponding to the index number in accordance with a symbol position of the power-saving signal.

10. The signal processing method according to claim 1, wherein prior to monitoring the power-saving signal in accordance with the time-domain position, the signal processing method further comprises:
determining a target beam direction for monitoring the power-saving signal in accordance with a beam direction of a received system synchronization block, and a relationship between a beam direction of the power-saving signal and the beam direction of the system synchronization block.

11. The signal processing method according to claim 10, wherein the monitoring the power-saving signal in accordance with the time-domain position comprises:
monitoring the power-saving signal corresponding to the target beam direction in the power-saving signal occasion in accordance with the position of the power-saving signal occasion in the time-domain position.

12. The signal processing method according to claim 11, wherein the time-domain configuration information comprises at least one of:
a frame offset for determining a frame position where the power-saving signal occurs;
an occurring occasion for determining a start position of each power-saving signal occasion;
the quantity of power-saving signals within one beam sweeping periodicity;
a periodicity for determining a position where the power-saving signal occurs;
a periodicity offset for determining the position where the power-saving signal occurs;
a symbol position for indicating a symbol corresponding to the power-saving signal occurring within one slot or indicating that a start position of the power-saving signal corresponds to a symbol within one slot;
a duration for indicating the quantity of consecutive slots or consecutive symbols occupied by the power-saving signal;
a relationship between a beam direction of the power-saving signal and a beam direction of a system synchronization block;
a relationship that is between a periodicity of the power-saving signal and a paging periodicity and used to indicate that one power-saving signal is equal to number k of paging periodicities.

13. The signal processing method according to claim 1, wherein prior to determining the time-domain position for monitoring the power-saving signal, the signal processing method further comprises:
receiving time-domain configuration information of a network device, wherein the time-domain configuration information is used to configure the time-domain position of the power-saving signal.

14. A User Equipment (UE), comprising: a transceiver, a memory, a processor, and a computer program stored in the memory and capable of being executed by the processor, wherein the processor is configured to execute the computer program to:
determine a time-domain position for monitoring a power-saving signal;
monitor the power-saving signal in accordance with the time-domain position,
wherein the processor is further configured to execute the program to:
obtain each radio frame corresponding to the power-saving signal;
obtain an index number corresponding to a power-saving signal monitoring occasion, wherein the index number is a logic serial number corresponding to a power-saving signal monitoring occasion among all power-saving signal occasions within one paging periodicity or one power-saving signal periodicity, and a start point of each of the all power-saving signal occasions is the respective radio frame; and
obtain the time-domain position of the power-saving signal corresponding to the index number.

15. The UE according to claim 14, wherein the processor is further configured to execute the program to:
when the power-saving signal periodicity is equal to the paging periodicity, obtain an System Frame Number (SFN) corresponding to the power-saving signal through a formula (SFN+powersavingframeoffset) mod T=(T div N)*(UE_ID mod N); and
when the power-saving signal periodicity is equal to number k of paging periodicities, obtain the SFN corresponding to the power-saving signal through a formula (SFN+powersavingframeoffset) mod (k*T) =(T div N)*(UE_ID mod N), where k is an integer greater than 1,
wherein powersavingframeoffset represents a frame offset of the power-saving signal, T represents the paging periodicity, N represents the quantity of paging radio frames within one paging periodicity, and UE_ID=Serving-Temporary Mobile Subscriber Identity (S-TMSI) mod 1024; or
the processor is further configured to execute the program to:
take an SFN corresponding to a paging monitoring occasion as the SFN corresponding to the power-saving signal.

16. The UE according to claim 14, wherein the processor is further configured to execute the program to:
obtain an index number i_s through a formula i_s=floor (UE_ID/N) mod Ns, where Ns represents the quantity of paging occasions associated with one paging radio frame, and UE_ID=Serving-Temporary Mobile Subscriber Identity (S-TMSI) mod 1024.

17. The UE according to claim 14, wherein the time-domain position comprises a start time point;
the processor is further configured to execute the program to:
determine a start time point of the power-saving signal occasion corresponding to a current index number.

18. The UE according to claim 14, wherein the processor is further configured to execute the program to:
take a time-domain start position of an $[(i\_s*x)+1]^{th}$ power-saving signal as the start time point of the power-saving signal occasion corresponding to the current index number; or
look up the start time point of the power-saving signal monitoring occasion corresponding to the current index number in accordance with a start position of each configured power-saving signal occasion,
where i_s represents the index number corresponding to the power-saving signal occasion, and x represents the quantity of power-saving signals within a beam sweeping periodicity corresponding to one power-saving signal monitoring occasion.

* * * * *